Jan. 1, 1924
1,479,001
R. G. LOCKETT
MOTOR CONTROLLER
Filed Jan. 30, 1922
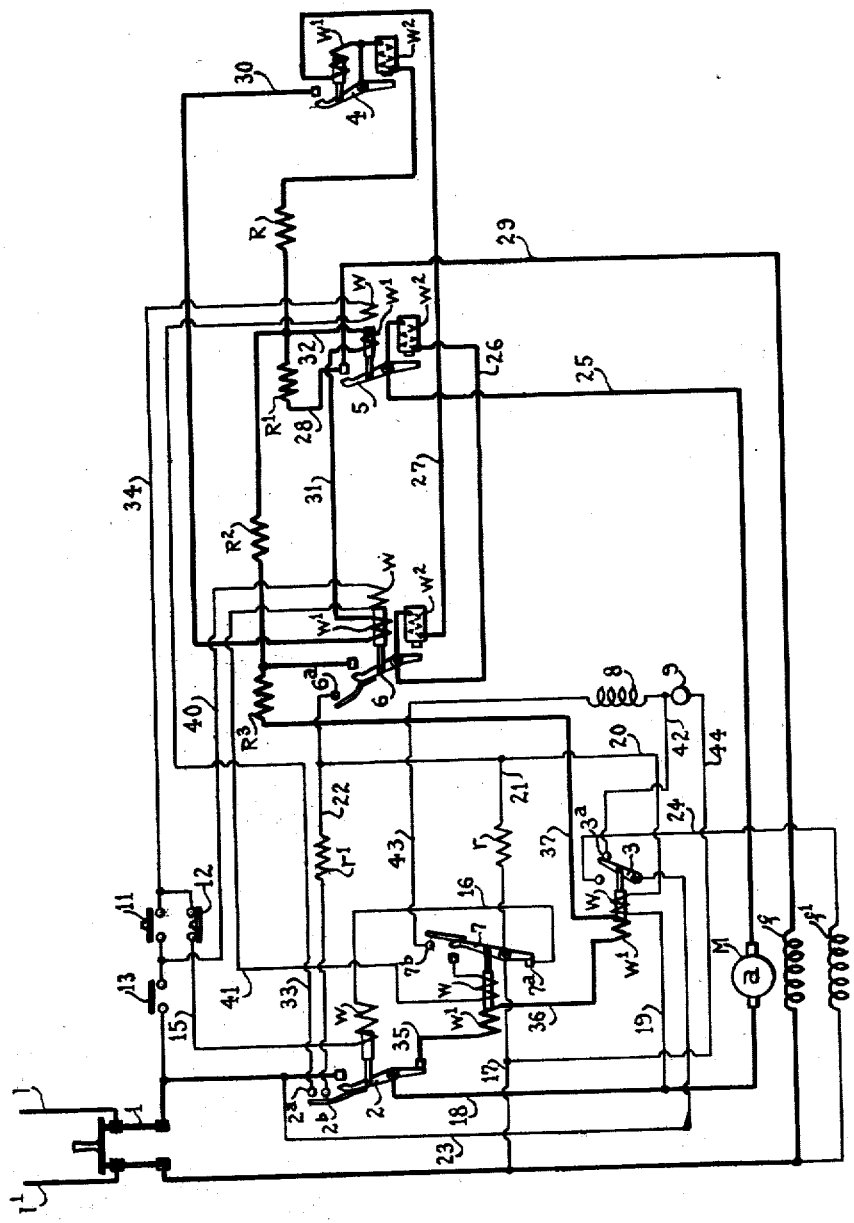
INVENTOR.
Ralph G. Lockett
BY
ATTORNEY Patented Jan. 1, 1924.

1,479,001

UNITED STATES PATENT OFFICE.

RALPH G. LOCKETT, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed January 30, 1922. Serial No. 532,605.

*To all whom it may concern:*

Be it known that I, RALPH G. LOCKETT, a citizen of the United States, residing at Milwaukee, in the county of Milwaukee and State of Wisconsin, have invented new and useful Improvements in Motor Controllers, of which the following is a full, clear, concise, and exact description, reference being had to the accompanying drawing, forming a part of this specification.

This invention relates to improvements in motor controllers.

While not limited thereto the invention is particularly applicable to controllers for motor driven extractors and other machines having a high moment of inertia, where the motor is employed to bring the extractor or other machine to rest by the dynamic braking action of such motor. As will be understood the shunt field of the motor must be protected against overheating when the motor is at rest, while on the other hand it is highly desirable to maintain full excitation of the shunt field until the motor and its associated machine are brought to a standstill as otherwise the stopping period is prolonged due to cessation of the dynamic braking action of the motor.

Such prolonged and uncertain stopping periods are very undesirable in many instances particularly in extractor control and the present invention has among its objects to provide a controller embodying simple and efficient means to insure full shunt field strength until the motor and its associated machine are brought to a standstill by the dynamic braking action of the former while at the same time insuring protective commutation of the shunt field connections promptly upon arrest of the motor.

Another object is to provide such a controller wherein the means functioning to maintain full field strength during dynamic braking also functions to insure full field strength for starting and moreover tends to maintain full shunt field strength of the motor during the transition from running connections to dynamic braking connections.

Another object is to provide a controller embodying shunt field control means functioning as stated and providing for interruption of the shunt field circuit when the motor is stopped.

Another object is to provide a controller embodying means of the aforesaid character functioning either with or without the foregoing results to control safety or indicating devices and particularly to effect operation thereof when but not until the motor is brought to rest.

Various other objects and advantages of the invention will hereinafter appear.

The accompanying drawing diagrammatically illustrates a controller embodying the invention in one form and the same will now be described, it being understood that the embodiment illustrated is susceptible of various modifications without departing from the scope of the appended claims.

The controller illustrated is particularly designed for extractor control, the extractor to be driven by a suitable motor, such as the motor M illustrated which has an armature $a$, a series field $f$ and a shunt field $f'$. This motor is shown as supplied from a direct current supply line $l$—$l'$ through a knife switch 1 and electromagnetic switches 2 and 3.

The switch 2 controls the continuity of the armature and series field circuit of the motor, said switch being of the double throw type and normally standing in a position to interrupt said circuit. When in such position the switch 2 completes a dynamic braking circuit for the motor comprising a closed loop including the armature and excluding the series field winding $f$. The switch 3 on the other hand controls the continuity of the shunt field circuit of the motor and normally stands in a position to interrupt said circuit. This switch must therefore be energized for starting, running and dynamic braking.

The switch 3 has a low voltage shunt winding $w$ and a series winding $w'$. The former winding is so controlled as to operate the switch immediately upon response of switch 2 and is maintained energized throughout the running period whereby connection of the shunt field is insured for starting and running. During dynamic braking the winding $w$ is connected across the motor armature and the same is so designed as to hold the switch closed until the motor is brought practically to a standstill. Accordingly this winding which is connected directly across the line during running requires protection and to this end the same has included in series therewith a resistance $r$ and also preferably has connected in shunt therewith a resistance $r'$. On the other hand, to obtain the desired functioning of the winding $w$ during dynamic braking it is necessary to exclude from the circuit thereof the resistance $r$ and to interrupt the shunt including resistance $r'$. To this end the shunt circuit including the resistance $r'$ is preferably placed under the control of auxiliary contacts $2^a$ of the switch 2 whereby as shown release of said switch to interrupt the motor circuit effects interruption of said shunt circuit. However, exclusion of the resistance $r$ is preferably delayed especially in view of the provision of the series winding $w'$ which is included in series in the dynamic braking circuit and which acts cumulatively with the shunt winding to hold the switch 3 closed for dynamic braking. As will hereinafter appear, means are preferably provided for graduating the dynamic braking action of the motor to maintain a high mean value of the braking current whereby reduction of the resistance of the circuit of the shunt winding $w$ may be delayed until completion of the operation of such graduating means. Accordingly such means may be, and preferably is, employed to exclude the resistance $r$ at an appropriate time whereby the winding $w$ is rendered effective to a maximum degree for retaining the switch 3 in closed position and it has been found that a relay of the type shown when controlled as described may be designed in accordance with well known principles to maintain the continuity of the shunt field circuit until the motor is brought practically to a standstill. Thereupon the supply of current from the motor to the relay windings is terminated thus causing said relay to promptly release and disconnect the shunt field from circuit.

As will hereinafter appear, the circuit connections of the winding $w$ of switch 3 are such that said winding is subjected to the E. M. F. of the motor during transition from running connections to dynamic braking connections and accordingly said winding tends to maintain the relay energized to maintain continuity of the shunt field circuit during such transition. It will therefore be apparent that by proper design of the controller the continuity of the shunt field circuit may be definitely maintained during the transition period.

More specifically considering the system illustrated, the motor is started with resistances R and R' in series with its armature, said resistances being adapted to be sequentially excluded from circuit by so-called lockout switches 4 and 5 respectively as the motor accelerates. The resistance R is also arranged for inclusion in the dynamic braking circuit of the motor together with additional resistances $R^2$ and $R^3$ and said resistances R and $R^2$ are arranged to be excluded from circuit sequentially under given current conditions to maintain the braking current at a high mean value. The resistance R is so excluded by the switch 4 while the resistance $R^2$ is so excluded by a so-called lockout switch 6.

Each of the switches 4, 5 and 6 has a series operating winding $w'$ and a series lockout winding $w^2$, the latter functioning as is well understood to prevent response of its respective switch so long as the motor current exceeds a given value. Further the switches 5 and 6 are each provided with a shunt winding $w$, to act cumulatively with its series operating winding, each switch being designed to require cumulative action of its windings for operation thereof. The shunt winding $w$ of switch 5 is under the control of auxiliary contacts $2^b$ of the main switch 2 while the shunt winding $w$ of switch 6 is under the control of an electro-responsive relay 7. Switch 6, which is the last to respond for graduation of the dynamic braking action of the motor, has auxiliary contacts $6^a$ to shunt the resistance $r$ for increasing the effectiveness of the shunt field switch 3 as heretofore set forth.

The relay 7 has a series operating winding $w'$ which is included in the dynamic braking circuit of the motor and a shunt holding winding $w$, the circuit of which is completed upon response of said relay. This relay normally interrupts the circuit of the shunt winding of switch 6 thereby insuring against response of said switch except when the motor is acting as a dynamic brake. Also this relay has normally closed contacts $7^a$ in series with the shunt winding $w$ of main switch 2 and auxiliary contacts $7^b$ in series with the coil 8 of a safety device.

The circuit of the coil 8 is completed by auxiliary contacts $3^a$ of the field controlling switch 3 when released and said coil under the control of said switch and relay may be employed to trip the cover latch of the extractor or to perform any other desired function when but not until the motor is brought to rest. The auxiliary contacts of switch 3 are also utilized to complete the circuit of a lamp 9 when the motor is brought to a standstill.

For controlling the aforementioned instrumentalities there are provided a starting switch 11, a stopping switch 12 and a safety switch 13. The switches 11 and 12 are of the push button type, the former being normally open and the latter normally closed. The switch 13 which is normally open may be arranged to be closed by closure of the extractor cover or the same may be associated with any preferred part of the driven mechanism.

When the switches 13 and 11 are closed, circuit may be traced from line $l$ through said switches and through stop switch 12 by conductor 15 to and through the winding of main switch 2 by conductor 16 through the contacts $7^a$ of relay 7 by conductor 17 to line $l'$. This effects response of main switch 2 and upon response thereof circuit is completed from line $l'$ through the main switch by conductors 18 and 19 through winding $w$ of switch 3 by conductors 20 and 21 through resistance $r$ by conductor 17 to line $l'$. Completion of this circuit effects energization of switch 3 to complete the circuit of the shunt field winding, and closure of main switch 2 additionally completes the circuit of the motor armature and series field. Also response of main switch 2 connects resistance $r'$ in shunt with the winding $w$, of switch 3, this shunt extending from the right hand terminal of said winding by conductors 20 and 22 through resistance $r'$ to and through the auxiliary contacts $2^a$ of main switch 2 by conductors 18 and 19 to the opposite terminals of said winding.

The shunt field circuit of the motor may then be traced from line $l$ by conductor 23 through switch 3 by conductor 24 through said shunt field to line $l'$. On the other hand switch 2 completes circuit from line $l$ by conductor 18 to and through the motor armature by conductor 25 to and through the lockout winding of switch 5 by conductor 26 to and through the lockout winding of switch 6 by conductor 27 to and through the operating and lockout windings of switch 4 and the resistances R and R' in series by conductors 28 and 29 to and through the series field $f$ to line $l'$. These connections manifestly render the switch 4 responsive subject to delay by excessive current conditions in the motor circuit.

Switch 4 in responding completes circuit from a point intermediate its operating and lockout windings by conductor 30 to and through the series winding $w'$ of switch 6 by conductor 31 through the series operating winding of switch 5 and thence by conductor 32 to a point between resistances R and R'. This excludes the resistance R from the motor circuit and includes in circuit the operating winding $w'$ of switch 5 whereupon said switch is rendered responsive subject to delay by excessive current conditions in the motor circuit. When switch 5 responds it completes circuit from the right hand terminal of the motor armature direct to conductor 29 thereby short-circuiting resistance R' and also shortcircuiting the operating winding of switch 4 and its own operating winding. Switch 4 is thus released to be in readiness for dynamic braking but the switch 5 is held closed by its winding $w$ the circuit of which extends from auxiliary contacts $2^a$ of main switch 2 by conductor 33 to and through said winding by conductor 34 to and through the stop switch and thence through the operating winding of switch 2 as already traced. This circuit also obviously constitutes a maintaining circuit for the main switch 2.

Assuming now that the push button 12 is depressed, it will be apparent that both the switch 5 and the main switch 2 will be deenergized, thus reinserting in the motor circuit the resistances R and R' and interrupting the power connections of the motor armature, the switches being designed to effect these commutations progressively in the order named. Also it will be obvious that such operation of the main switch 2 will complete the dynamic braking circuit of the motor which may be traced from the left hand terminal of the motor armature by conductor 18 to and through the down contacts of switch 2 by conductor 35 through the winding $w'$ of relay 7 by conductor 36 through winding $w'$ of switch 3 by conductor 37 to and through resistances $R^3$, $R^2$ and R in series and thence through both windings of switch 4 by conductor 27 through the lockout winding of switch 6 by conductor 26 to and through the lockout winding of switch 5 to conductor 25 leading to the right hand terminal of the motor armature.

Also when power connections are interrupted circuit may be traced from the left hand terminal of the motor armature by conductors 18 and 19 through the shunt winding $w$ of the field switch 3 by conductors 20 and 21 through resistance $r$ by conductor 17 to the left hand terminal of the series field which has its right hand terminal connected to the right hand terminal of the motor armature as above described. Thus the winding $w$ of the switch 3 is subjected to the E. M. F. of the motor during the transition period and if properly designed will hold the switch 3 closed to maintain the continuity of the shunt field circuit. Moreover, as soon as the braking circuit is completed the winding $w'$ of switch 3 is energized by the braking current to act cumulatively with the winding $w$ to hold switch 3 closed.

As will be apparent from the above description of the braking circuit the switch 4 has both of its windings connected in said circuit whereby upon reduction of the braking current to a given value said switch will respond to exclude from circuit the resistance R. The braking circuit will then extend from the right hand terminal of resistance $R^2$ by conductor 32 to and through the winding $w'$ of switch 5 by conductor 31 to and through the winding $w'$ of switch 6 by conductor 30 to and through switch 4 and its operating winding by conductor 27 to and through the lockout windings of switches 6 and 5 and thence to the right terminal of the motor armature. This commutation of connections subjects the winding $w'$ of switch 6 to the braking current for action cumulatively with the winding $w$ of said switch the latter winding being energized by closure of relay 7. More specifically, upon closure of relay 7 circuit is completed from line $l$ through safety switch 13 by conductor 40 to and through the winding $w$ of switch 6 by conductor 41 to and through the winding $w$ of switch 7 and thence through the main contacts of said switch to line $l'$. Accordingly when the braking current is again reduced to a given value the switch 6 is caused to respond to short-circuit the resistance $R^2$. The braking circuit then extends from a point between resistances $R^3$ and $R^2$ to and through switch 6 by conductor 26 to and through the lockout coil of switch 5 by conductor 25 to the right hand terminal of the motor armature. The resistance of the braking circuit is thus reduced to effect stopping of the motor without further resistance commutations although it will of course be understood that the resistance may in practice be excluded in any preferred number of steps.

Moreover response of switch 6 completes a circuit from the right hand terminal of the shunt winding $w$ of switch 3 by conductors 20 and 22 through the auxiliary contacts $6^a$ of switch 6 to conductor 26 and thence through the lockout winding of switch 5 to the right hand terminal of the motor thus placing said winding $w$ across the terminals of the motor armature exclusive of the resistance $r$. While as shown the resistance $r$ is excluded in a single step it will of course be apparent that the same might be excluded in a number of steps controllable by different decelerating switches. Also it will be understood that by properly designing the winding $w$ the same may, when so connected across the motor armature, be caused to hold the switch 3 closed until the motor is brought practically to a standstill, even though the winding $w'$ is in the meantime practically deenergized by reduction of the braking current.

When the switch 3 is finally released a circuit may be traced from line $l$ by conductor 23 to and through the auxiliary contacts $3^a$ of said switch by conductor 42 to and through the coil 8 of the safety device by conductor 43 to and through the auxiliary contacts $7^b$ of relay 7 by conductor 17 to line $l'$. Also a parallel circuit may be traced from conductor 42 to the lamp 9 by conductors 44 and 17 to line $l'$. Thus both of the instrumentalities 8 and 9 are energized when but not until the motor is brought practically to a standstill and the lamp 9 is maintained energized until the motor is restarted. However, the coil 8 is de-energized upon opening of the safe switch 13 which interrupts the circuit of the coils $w$ of switch 6 and relay 7, said relay 7 in turn interrupting the circuit of coil 8.

What I claim as new and desire to secure by Letters Patent is:

1. In a controller for a motor driven machine in combination, stopping means, an electro-responsive device to be energized throughout operation of the driven machine and to be de-energized upon stopping thereof, said device having an energizing winding designed for relatively low voltage and connections subjecting the same to the E. M. F. of the motor, protective resistance included in circuit with said winding and means for excluding said resistance from the circuit of said winding as the motor is slowed down.

2. In a dynamic braking controller for a motor having a shunt field, in combination, an electro-responsive switch for controlling the shunt field strength of the motor, said switch having an energizing winding designed for relatively low voltage and connections subjecting the same to the E. M. F. of the motor, protective resistance included in circuit with said winding and means for excluding said resistance from the circuit of said winding as the motor is slowed down.

3. In a dynamic braking controller for a motor having a shunt field, in combination, an electro-responsive switch for controlling the shunt field strength of the motor, said switch having a winding for connection in series in the braking circuit of the motor and a winding designed for relatively low voltage and having connections independent of the former winding for subjecting the same to the E. M. F. of the motor, protective resistance included in circuit with said low voltage winding and means for excluding said resistance from the circuit as the motor is slowed down.

4. In a dynamic braking controller for a motor having a shunt field, in combination, means for establishing a dynamic breaking circuit for the motor including resistance and decreasing said resistance as the motor slows down, an electro-responsive switch to control the shunt field strength of the motor, said switch having an energizing winding designed for relatively low voltage and having connections subjecting the same to the E. M. F. of the motor, and a protective resistance for said winding having connections whereby the same is excluded from the circuit of said winding by said means.

5. In a dynamic braking controller for a motor having a shunt field, in combination, an electro-responsive switch to control the shunt field strength of the motor, said switch having an energizing winding and connections subjecting the same to the E. M. F. of the motor, protective resistance normally included in circuit with said winding and automatic means effecting graduated dynamic braking of the motor and exclusion of said protective resistance from the circuit of said switch winding upon slow down of the motor.

6. In a dynamic braking controller for a motor having a shunt field, in combination, means for establishing dynamic braking connections for the motor including resistance and for varying such resistance, a switch controlling the shunt field strength of the motor, said switch having a winding for inclusion in said dynamic braking connections and a winding independently connected to the motor to be subjected to the E. M. F. thereof, and a protective resistance for the latter winding having connections subjecting the same to control by said means for exclusion thereof from circuit whereby said switch is caused to maintain a high shunt field strength until the motor is brought practically to a standstill.

7. In a controller for a motor having a shunt field, the combination with an electro-responsive switch to control the motor shunt field, said switch having an energizing winding designed for relatively low voltage and having protective resistance therefor, of means to control the motor for running and dynamic braking including means to connect said switch winding through its protective resistance to the motor supply circuit for running and to subject said switch winding exclusive of its protective resistance to the E. M. F. of said motor for final dynamic braking.

8. In a controller for a motor having a shunt field, the combination with an electric switch to control the shunt field strength of the motor, said switch having an energizing winding permanently connected to the motor to be subjected to the E. M. F. thereof, of means to control the motor for running and dynamic braking including a switch to connect said winding to the motor supply circuit for running and a protective resistance for said winding also controlled by said means to be excluded from circuit thereby for causing said switch to maintain a high shunt field strength until the motor is brought practically to a standstill.

9. In a controller for a motor having a shunt field to be protected while the motor is idle, the combination with an electro-responsive switch serving when de-energized to protect the motor shunt field and responsive to strengthen the latter, said switch having an energizing winding designed for relatively low voltage and permanently connected to the motor to be subjected to the E. M. F. thereof and further having a protective resistance normally in series with said winding, of means to control the motor for running and dynamic braking including means to connect said winding to the motor supply circuit through said resistance for running and to exclude said resistance from the motor connections of said winding as the motor is slowed down by its dynamic braking action.

10. In a controller for a motor having a shunt field to be protected when the motor is idle, the combination with an electro-responsive switch serving when de-energized to protect the motor field and responsive to strengthen the latter, said switch having an energizing winding designed for relatively low voltage, protective resistance therefor and permanent circuit connections subjecting said winding to the E. M. F. of the motor through said resistance, of an additional protective resistance for said winding and means to control the motor for running and dynamic braking including means whereby said winding is connected to the motor supply circuit through the first mentioned resistance and shunted by the second mentioned resistance for running and whereby upon interruption of the motor supply circuit, said winding is disconnected from the second mentioned protective resistance for dynamic braking and subsequently connected directly to the motor exclusive of the first mentioned resistance for causing said switch to maintain a high shunt field strength until the motor is brought practically to a standstill.

11. In a controller for a motor having a shunt field, in combination, means for establishing running and dynamic braking connections for the motor armature, a switch to control the motor field and to strengthen the same for running and dynamic braking, said switch having a winding to be included in the dynamic braking circuit of the motor, a winding designed for relatively low voltage and a protective resistance for the latter winding, permanent connections subjecting said low voltage winding through said resistance to the E. M. F. of the motor and connections controlled by said means whereby said low voltage winding is connected to the supply line through said protective resistance for running and whereby said resistance is excluded from the permanent connections of said winding as the motor is slowed down by its dynamic braking action.

12. In a controller for a motor having a shunt field in combination, means to establish running and dynamic braking connections for the motor and for automatically graduating the dynamic braking action of the motor, an electro-responsive switch to control the shunt field of the motor and to strengthen the same for running and dynamic braking, said switch having a winding for inclusion in the dynamic braking circuit of the motor, a winding designed for relatively low voltage and a protective resistance for the latter, permanent connections for said low voltage winding subjecting the same through said protective resistance to the E. M. F. of the motor and connections controlled by said means whereby said low voltage winding is connected to the motor supply circuit through said resistance for running and whereby said protective resistance is excluded from the permanent connections of said low voltage winding during final braking action of the motor.

13. In a controller for a motor driven machine in combination, stopping means, means to function upon arrest of the machine, an electro-responsive controlling device for the latter means, said device having an energizing winding designed for relatively low voltage and connections subjecting the same to the E. M. F. of the motor, protective resistance normally included in circuit with said winding and means for excluding said resistance from the circuit of said winding as the motor is slowed down whereby said winding is maintained energized until the motor is brought substantially to rest.

In witness whereof, I have hereunto subscribed my name.

RALPH G. LOCKETT.